US012704181B2

(12) United States Patent
Laukemann et al.

(10) Patent No.: US 12,704,181 B2
(45) Date of Patent: Aug. 11, 2026

(54) SEALING SYSTEM

(71) Applicant: Driventic GmbH, Heidenheim an der Brenz (DE)

(72) Inventors: Dieter Laukemann, Frankenhardt (DE); Alexander Martin, Kressberg (DE); Martin Blumenstock, Frankenhardt (DE)

(73) Assignee: Driventic GmbH, Heidenheim an der Brenz (DE)

( * ) Notice: Subject to any disclaimer, the term of this patent is extended or adjusted under 35 U.S.C. 154(b) by 0 days.

(21) Appl. No.: 18/899,035

(22) Filed: Sep. 27, 2024

(65) Prior Publication Data

US 2025/0020213 A1 Jan. 16, 2025

Related U.S. Application Data

(63) Continuation of application No. PCT/EP2023/059050, filed on Apr. 5, 2023.

(30) Foreign Application Priority Data

May 23, 2022 (DE) .................... 10 2022 112 905.5

(51) Int. Cl.
*F16J 15/3284* (2016.01)

(52) U.S. Cl.
CPC ................................ *F16J 15/3284* (2013.01)

(58) Field of Classification Search
CPC ........ F16J 15/3284; F16J 15/44; F16J 15/441; F16J 15/56
See application file for complete search history.

(56) References Cited

U.S. PATENT DOCUMENTS 7,341,256 B2 * 3/2008 Nakaoka .................. F16J 15/32 277/496
10,309,539 B2 * 6/2019 Kakehi .................. F16J 15/441
(Continued)

FOREIGN PATENT DOCUMENTS

DE 1 162 464 B 2/1964
DE 6 929 111 U 9/1970
(Continued)

OTHER PUBLICATIONS

German Office Action dated Nov. 22, 2022 for German Patent Application No. 10 2022 112 905.5 (10 pages).
(Continued)

*Primary Examiner* — Gilbert Y Lee
(74) *Attorney, Agent, or Firm* — TAYLOR & EDELSTEIN, PC

(57) ABSTRACT

A sealing system for separating two pressure zones includes: a shaft including a groove, which includes a plurality of groove sealing surfaces; a component; and a seal arranged between the shaft and the component, the seal being configured for moving axially in the groove, the seal including a plurality of sealing surfaces, wherein, based on a plurality of pressure conditions in the two pressure zones, the seal is configured for being moved into a first functional position or a second functional position, wherein the seal further includes a sliding region and a radial sealing surface including a diameter D that is adjustable elastically by the sliding region.

4 Claims, 2 Drawing Sheets

(56) References Cited

U.S. PATENT DOCUMENTS

| | | | | |
|---|---|---|---|---|
| 10,634,254 | B2 * | 4/2020 | Watanabe | F16J 15/164 |
| 10,760,687 | B2 * | 9/2020 | Yamaguchi | F16J 15/48 |
| 2016/0116066 | A1 | 4/2016 | Watanabe et al. | |
| 2020/0300370 | A1 | 9/2020 | Yoshida et al. | |

FOREIGN PATENT DOCUMENTS

| | | | |
|---|---|---|---|
| DE | 102 42 735 | A1 | 3/2004 |
| DE | 10 2020 107 729 | B3 | 6/2021 |
| EP | 2 666 980 | A1 | 11/2013 |

OTHER PUBLICATIONS

Notification of the Transmission of the International Search Report and Written Opinion of the International Search Authority or Declaration dated Aug. 2, 2023 for International Application No. PCT/EP2023/059050 (12 pages).

* cited by examiner 16
13.2
15
D1
7.2

SEALING SYSTEM

CROSS REFERENCE TO RELATED APPLICATIONS

This is a continuation of PCT application no. PCT/EP2023/059050, filed Apr. 5, 2023, which is incorporated herein by reference. PCT application no. PCT/EP2023/059050 claims priority to German patent application 10 2022 112 905.5, filed May 23, 2022, which is incorporated herein by reference.

BACKGROUND OF THE INVENTION

1. Field of the Invention

The present invention relates to sealing systems.

2. Description of the Related Art

The advancement in technology necessitates that sealing systems are also adapted to the increased demands. One specific requirement of a sealing system is if said system is to have different characteristics, in particular sealing characteristics, for different operating conditions.

One area of application for a sealing system with different functional positions is its use in a hydrodynamic retarder. It is generally known that retarders have a working chamber that can be filled with a working medium to hydrodynamically transfer torque from a driven rotor to a stator.

The working chamber of the retarder is connected to a retarder working medium circuit in which the working medium—for example oil, or cooling water of the vehicle cooling circuit—can circulate. Radial shaft sealing rings and a rectangular ring are used to seal the retarder circuit with respect to the rotor shaft. The rectangular ring is a separating element which is positioned between the working chamber and the shaft sealing rings. The rectangular ring is used as a relief element for the radial shaft sealing rings, so that no excessive pressure from the working chamber can act on the radial shaft sealing rings, wherein a certain leakage is desired depending on the pressure conditions. The sealing effect of the rectangular ring is therefore dependent on the applied pressure during a braking or non-braking operation. Since the rotor shaft rotates in both operating states, it is necessary in both operating states that the sealing locations are lubricated and cooled by an oil stream.

A retarder having a cooled sealing system is known from DE 10 2020 107 729 A1. The sealing system includes a rectangular ring that is arranged between working chamber and radial shaft sealing ring. This is designed so that a leakage flow is made possible, which—depending on the operating state—changes its direction. However, based on design, the leakage flow can only be influenced to a limited extent and depends essentially on manufacturing tolerances.

A sealing system is known from EP 2 666 980 A1 which can be moved in two functional positions.

Another sealing system is known from DE 1 162 464 B and DE 6 929 111 U.

DE 10 242 735 A1 discloses a retarder with a sealing system.

What is needed in the art is a sealing system with improved properties.

SUMMARY OF THE INVENTION

The invention relates to a sealing system for separation of two pressure zones, including two functional positions and the use of such a sealing system in a hydrodynamic retarder.

The starting point is a sealing system for separating two pressure zones, including a seal arranged between a shaft and a component.

According to the present invention it is proposed that the seal is arranged axially movable in a groove, wherein the seal has sealing surfaces, and the groove has groove sealing surfaces, wherein based on the pressure conditions in the pressure zones the seal can be moved into a first functional position or into a second functional position. In terms of the present invention, the seal is arranged to be axially movable in the groove. Different sealing characteristics can be implemented in the functional positions.

In one optional design, it may be provided that in the first functional position a separation of the pressure zones is achieved, and that in the second functional position a pressure equalization between the pressure zones is made possible due to at least one of the sealing surfaces and/or one of the groove sealing surfaces having recesses, so that in the second functional position a channel remains between the pressure zones.

The channel is optionally formed in that recesses, designed as a pocket region in the sealing surface of the seal and as a recess adjacent to the groove, are provided. The recess can thereby be designed circumferentially around the shaft, and the at least one pocket region in the sealing surface can be provided by a partial region, so that only a relatively small channel region is created over the circumference when the sealing surface of the seal is moved towards the groove sealing surface into the second functional position.

In an optional embodiment, the sealing surfaces of the seal are designed symmetrically and the channel size can be defined by the design or dimensioning of the recess. Thus, when the seal is installed, no consideration needs to be given to the alignment of the seal.

Furthermore, it can be provided that the seal has a radial sealing surface, whose diameter D can be adjusted elastically by a sliding region. The sliding region can moreover be designed in such a way that the inside diameter can be increased such that the seal can be mounted over the shaft.

Moreover, a retarder is proposed including a described sealing system, wherein the first pressure zone includes a working chamber of the retarder and wherein, based on the pressure ratio between the pressure zones, the seal can be moved into a first or a second functional position. In the event of overpressure in the first pressure zone, it is provided that the seal is moved into the first functional position, where the pressure zones are sealed in respect to each other.

Moreover, the sealing system in the retarder can be designed so that, in the event of an overpressure in the second pressure zone, the seal is moved into the second functional position, so that a pressure equalization between the pressure zones is facilitated by at least one of the sealing surfaces and/or one of the groove sealing surfaces having recesses, so that in the second functional position a channel remains between the pressure zones which makes a pressure equalization possible.

In retarder operation there are two fundamental operating states-braking operation and non-braking operation. It is therein advantageous if a sealing system seals the circuit to the outside during braking operation and enables an air or oil flow from the outside into the circuit during non-braking operation. The present invention makes it possible to seal off the circuit to the outside during braking operation and allows oil or air to enter the circuit in idling mode.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate at least one embodiment of the invention, and such exemplifications are not to be construed as limiting the scope of the invention in any manner.

DETAILED DESCRIPTION OF THE INVENTION

Figure 1:
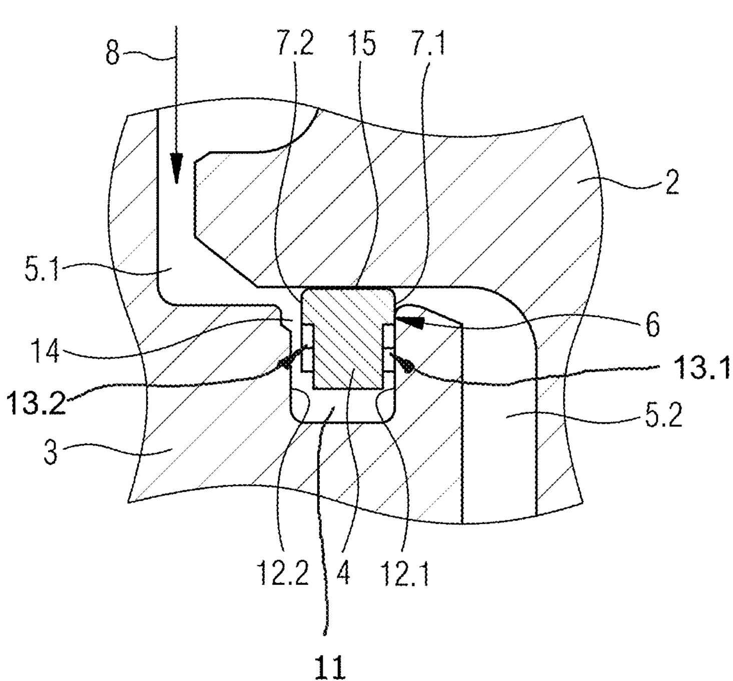
FIG. 1 is a sealing system in first functional position.

FIG. 1 shows sealing system 1 in the first functional position. Sealing ring 4 is arranged in groove 11 of shaft 3. Seal 4 was moved axially in accordance with the pressure conditions in pressure zones 5.1 and 5.2, so that first sealing surface 7.1 of seal 4 is pressed against groove sealing surface 12.1. A complete seal in respect to second pressure zone 5.2 occurs in sealing plane 6.

Figures 2, 3:
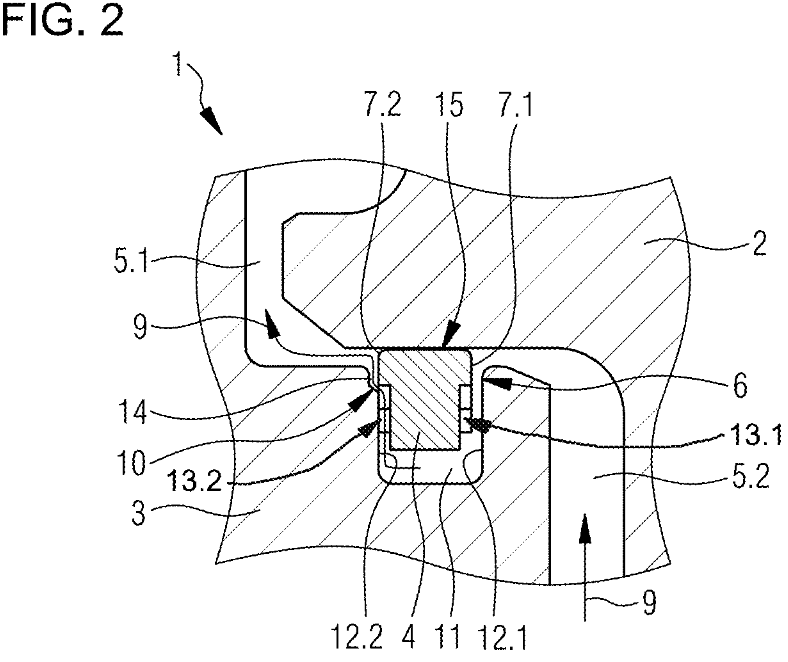
FIG. 2 is a sealing system in second functional position.
FIG. 3 is a view of seal.

Seal 4 is designed as a sealing ring or as a rectangular ring. The end surfaces of seal 4, that is, first sealing surface 7.1 and second sealing surface 7.2, form continuous surfaces, wherein the surfaces have recesses 13.1 and 13.2, as also shown in FIG. 3, which reduce sealing surfaces 7.1 and 7.2 in radial direction. The effective diameter for the seal is thus changed by recesses 13.1 and 13.2. In the first functional position it is nevertheless ensured that a full-surface contact is created in sealing plane 6 between first sealing surface 7.1 and groove sealing surface 12.1. Thus, seal 4 can be designed symmetrically.

An additional recess is provided adjacent to groove 11, which is designed here as a recess 14. A channel 10 is formed between shaft 3 and seal 4 by the combination of pocket region 13.2 and recess 14.

The second functional position is illustrated in FIG. 2. In this functional position, a pressure equalization can occur between pressure zones 5.1 and 5.2 via channel 10. In a retarder, the illustrated position of seal 4, corresponds to the position in non-braking operation, in which an air and/or oil volume flow or leakage flow can pass through channel 10 to the components located behind it.

In the context of the current invention, recesses can also be formed by bore holes or openings. The use of elastic elements is also conceivable. The desired air and/or oil volume flow can be adjusted via the size of recess 13.2 and/or recess 14.

To simplify installation of seal 4, seal 4 has a sliding region 16 which allows diameter D1 of the seal to be changed so that it can be easily mounted over the shaft.

For better understanding, FIG. 3 is a perspective view of seal 4. In this view, sliding region 16 is shown which allows inside diameter D1 of seal 4 to be changeable. By expanding the seal, it can thus be pushed over shaft 3 as far as the groove. Also clearly visible is one of the recesses 13.2 and sealing surfaces 7.2 which form a continuous surface which is not substantially interrupted by the design of sliding region 16.

COMPONENT IDENTIFICATION LISTING

1 sealing system
2 housing

3 shaft
4 seal
5.1 first pressure zone
5.2 second pressure zone
6 sealing plane
7.1 first sealing surface
7.2 second sealing surface
8.1 working medium
9 ancillary volume flow
10 channel
11 groove
12.1, 12.2 groove sealing surface
13.1, 13.2 recess
14 recess
15 radial sealing surface
16 sliding region
D1 inside diameter While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A sealing system for separating two pressure zones, the sealing system comprising:

a shaft including a groove, which includes a plurality of groove sealing surfaces;

a component; and a seal arranged between the shaft and the component, the seal extending axially in association with a longitudinal axis of the shaft, radially in association with a radial direction from the longitudinal axis, and circumferentially about the longitudinal axis, the seal being configured for moving axially in the groove, the seal including a plurality of sealing surfaces that include a first sealing surface and a second sealing surface opposing the first sealing surface axially, wherein, based on a plurality of pressure conditions in the two pressure zones, the seal is configured for being moved into a first functional position or a second functional position, wherein the seal further includes a sliding region and a radial sealing surface including a diameter D that is adjustable elastically by the sliding region, the seal further including an outside diameter that includes the radial sealing surface, wherein, in the first functional position, the sealing system is configured such that a separation of the two pressure zones is achieved, wherein, in the second functional position, the sealing system is configured such that a pressure equalization between the two pressure zones is made possible due to at least one of (i) at least one of the plurality of sealing surfaces having at least one first recess extending partially circumferentially such that in the second functional position a channel of the sealing system remains between the two pressure zones, the first sealing surface including the at least one first recess, the first sealing surface including an innermost radial extent and an outermost radial extent that is spaced apart radially from the innermost radial extent and extends to the outside diameter, the at least one first recess forming a gap in the innermost radial extent and extending radially outwardly of the innermost radial extent and circumferentially—but only partially circumferentially—about the shaft, and (ii) at least one of the plurality of groove sealing surfaces having a second recess such that in the second functional position the channel of the sealing system remains between the two pressure zones.

2. The sealing system according to claim 1, wherein the channel is formed in that the sealing system includes the at least one first recess and the second recess, the at least one first recess being formed as a pocket region in the first sealing surface of the seal, the second recess being adjacent to a remaining portion of the groove.

3. The sealing system according to claim 1, wherein the plurality of sealing surfaces of the seal are symmetrical.

4. A retarder, comprising:

sealing system configured for separating two pressure zones, the sealing system including:

a shaft including a groove, which includes a plurality of groove sealing surfaces;

a component; and a seal arranged between the shaft and the component, the seal extending axially in association with a longitudinal axis of the shaft, radially in association with a radial direction from the longitudinal axis, and circumferentially about the longitudinal axis, the seal being configured for moving axially in the groove, the seal including a plurality of sealing surfaces that include a first sealing surface and a second sealing surface opposing the first sealing surface axially, wherein, based on a plurality of pressure conditions in the two pressure zones, the seal is configured for being moved into a first functional position or a second functional position, wherein the seal further includes a sliding region and a radial sealing surface including a diameter D that is adjustable elastically by the sliding region, the seal further including an outside diameter that includes the radial sealing surface, wherein the two pressure zones include a first pressure zone and a second pressure zone, wherein the first pressure zone includes a working chamber of the retarder, wherein, based on a pressure ratio between the two pressure zones, the seal is configured for being moved into the first functional position or the second functional position, wherein, in the event of an overpressure in the first pressure zone, the seal is configured for being moved into the first functional position where the two pressure zones are sealed with respect to each other, wherein, in the event of an overpressure in the second pressure zone, the seal is configured for being moved into the second functional position such that a pressure equalization between the two pressure zones is facilitated by at least one of (i) at least one of the plurality of sealing surfaces having at least one first recess extending partially circumferentially such that in the second functional position a channel of the sealing system remains between the two pressure zones which makes the pressure equalization possible, the first sealing surface including the at least one first recess, the first sealing surface including an innermost radial extent and an outermost radial extent that is spaced apart radially from the innermost radial extent and extends to the outside diameter, the at least one first recess forming a gap in the innermost radial extent and extending radially outwardly of the innermost radial extent and circumferentially—but only partially circumferentially—about the shaft, and (ii) at least one of the groove sealing surfaces having a second recess such that in the second functional position the channel of the sealing system remains between the two pressure zones which makes the pressure equalization possible.

* * * * *